April 22, 1952 — R. F. E. STEGEMAN — 2,593,932
SPECTACLE FRAME
Filed Aug. 14, 1947

R.F.E. STEGEMAN
Inventor

Attorney

Patented Apr. 22, 1952

2,593,932

UNITED STATES PATENT OFFICE 2,593,932

SPECTACLE FRAME

Raymond F. E. Stegeman, Greece, N. Y., assignor to Bausch & Lomb Optical Company, Rochester, N. Y., a corporation of New York Application August 14, 1947, Serial No. 768,642

3 Claims. (Cl. 88—41)

This invention relates to spectacle frames and more particularly it has reference to such a frame which embodies a non-metallic semi-rim portion in which the lenses are held by metallic eyewires.

One of the objects of this invention is to provide a frame of the type described which will be relatively simple in structure yet neat in appearance and efficient in operation. Another object is to provide a frame of the type described which embodies improved means for holding the lenses in the non-metallic frame member. Still another object is to provide in a frame of the type described a metallic eyewire which completely surrounds the lens and is secured to the non-metallic frame member so as to facilitate the insertion and removal of the lens. These and other objects and advantages reside in certain novel features of construction, arrangement and combination of parts which will hereinafter be more fully described and pointed out in the appended claims.

Referring to the figures.

Figure 1:
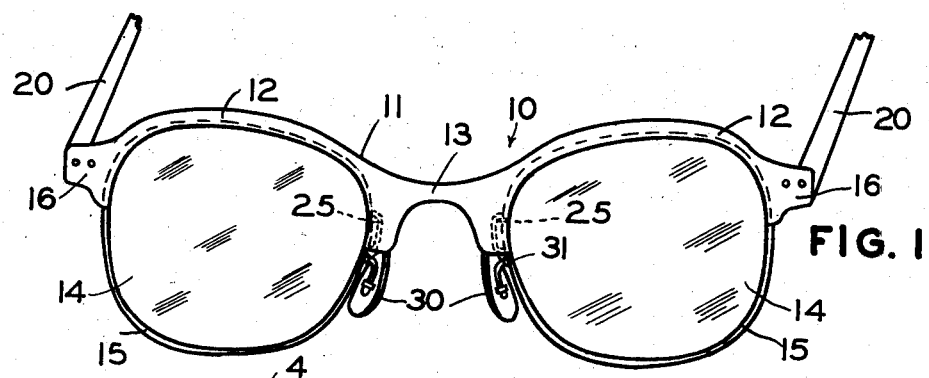
Fig. 1 is a front elevation of a spectacle frame embodying my invention, with the temples broken away.

A preferred embodiment of my invention is disclosed in the drawings wherein 10 indicates, generally, a spectacle frame comprising a non-metallic frame member 11 having the rim portions 12 connected by an integral bridge 13. The rim portions 12 have lateral extensions 16 to the rear faces of which hinge plates 17 are secured by rivets 18. The hinge plates 17 carry the usual hinge members 19 by means of which the temples 20 are pivotally mounted.

A pair of lenses 14 are held, respectively, in the metallic eyewires 15 which completely surround the lenses. The rim portions 12 have internal grooves 21 in which the upper portions of the eye wires 15 are seated. As shown in Fig. 1, the non-metallic rim portions 12 extend along the tops of the eyewires and partially down the nasal and temporal sides thereof. The eyewires 15 are split at the temporal sides and the adjacent ends of the eyewires carry, respectively, upper and lower barrel connectors 22 and 23. The upper connectors 22 are threaded so as to receive the screws 24 for detachably holding the connectors together for the purpose of retaining the lenses. The upper connectors 22 are soldered to the rear faces of the hinge plates 17 so that the eyewires 15 are thereby anchored to the temporal sides of the non-metallic rim portions. The nasal sides of the eyewires 15 are secured to the nasal sides of the rim portions by means of metallic loops or parts 25 which extend laterally from the eyewires. The metallic loops or parts 25 have the openings 26 within which are positioned the non-metallic insert blocks 27 having a thickness which is substantially the same as the depth of the openings 26. In order to secure the nasal portions of the eyewires to the rim portions 12, the non-metallic blocks 27 are placed within the openings 26 and cement is then applied to the exposed faces of the blocks 27. The parts are then assembled so that the loops 25 with their plastic blocks 27 are positioned snugly within recesses 28 formed in the non-metallic rim portions adjacent the grooves 21. The opposite faces of the blocks 27 thereby become bonded to the adjacent walls of the recesses 28 in the non-metallic rim portions 12 and thus firmly anchor the eyewires to the nasal portions of the frame.

Figures 2, 3, 4:
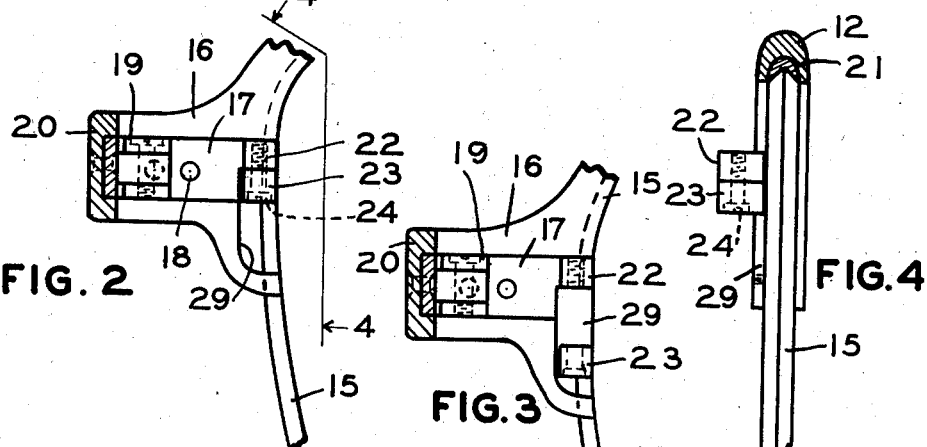
Fig. 2 is a fragmentary view showing the construction at the rear of the temporal portion of the frame.
Fig. 3 is a similar view showing the adjacent ends of the eyewire separated for the removal or insertion of the lens.
Fig. 4 is a view of the construction shown in Fig. 2 taken substantially along the line 4—4.
Figure 5:
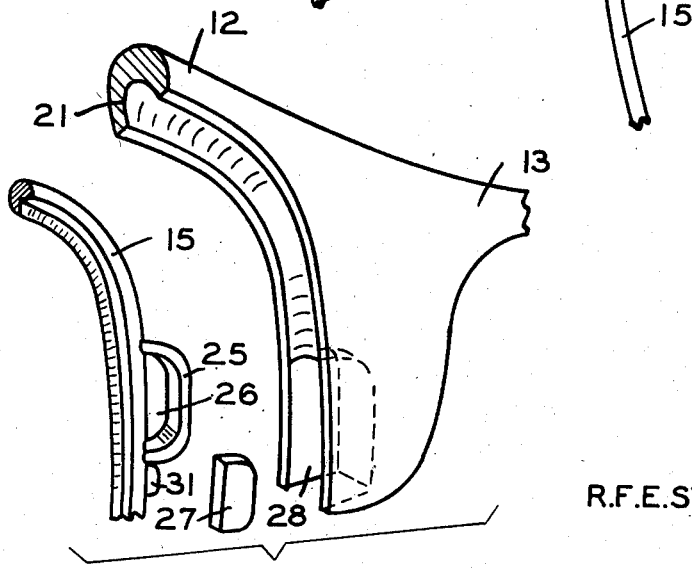
Fig. 5 is an exploded view showing the manner of attaching the eyewire to the frame member.

As shown in Fig. 4, the connectors 22 and 23 extend rearwardly of the plane of the rim portion 12. The rear faces of the temporal extensions 16 are provided with the recesses or cutaway portions 29 below the connectors 22 and 23. This permits the lower connectors 23 and the eyewires to be moved downwardly when the screws are removed so as to allow for the removal and insertion of the lenses. The usual nose pads 30 may be secured to the frame by the pad arms 31 which are soldered to the nasal sides of the eyewires 15.

From the foregoing, it will be apparent that I am able to attain the objects of my invention and provide an improved spectacle frame having a non-metallic upper portion to which the lenses are detachably secured by metallic eyewires. The non-metallic portion of the frame may, of course, be formed of any suitable plastic material or the like and the metallic eyewires may also be formed of any suitable material. Various combinations of materials may, accordingly, be combined so as to provide a frame which will be neat in appearance yet durable in structure. The lenses are held firmly by the surrounding metallic eyewires and the eyewires are in turn firmly secured to the non-metallic frame member so that a durable construction is assured. Lenses may be detachably secured in the eyewires with facility. Various modifications may obviously be made without departing from the spirit of my invention as pointed out in the appended claims.

I claim:

1. In a spectacle frame, the combination of a metallic eyewire surrounding a lens, the temporal side of the eyewire being split, upper and lower connectors on the adjacent ends of the eyewire, a screw for detachably uniting the connectors, a non-metallic frame member extending along the top of the eyewire and partially down the sides thereof and below the connectors, said frame member having a groove in which the eyewire is seated and secured, means on the nasal side of the eyewire for securing it to the frame member, a hinge plate secured to the temporal portion of the frame member, the connectors extending rearwardly of the plane of the frame member, the upper connector being secured to the hinge plate, the rear face of the frame member having a cut-away portion intersecting the groove and extending downwardly from the lower connector whereby the lower connector may be moved downwardly for removal and insertion of the lens.

2. In an ophthalmic mounting the combination of a lens, a non-metallic rim portion having a groove and extending along the upper and temporal edges of the lens, the rim portion having a lateral temporal extension, a split metallic eyewire surrounding the lens and positioned in the groove, means for securing the nasal portion of the eyewire to the rim portion, a metal hinge plate secured to the rear side of said extension, a threaded upper barrel connector secured to the hinge plate and the upper end of the split eyewire, a temple hingedly connected to the hinge plate, a lower barrel connector secured to the lower end of the eyewire and adapted to be aligned with the upper barrel connector, a screw passing through the lower connector and threaded into the upper connector for detachably holding the lens in the mounting, said extension having a part projecting below the hinge plate, said part having a recess below the hinge plate, the lower barrel connector being vertically movable in the recess whereby the lower barrel connector may be moved to permit the insertion or removal of the lens.

3. In a spectacle frame, the combination of a metallic eyewire surrounding a lens, the temporal side of the eyewire being split, upper and lower connectors on the adjacent ends of the eyewire, a screw for detachably uniting the connectors, a non-metallic frame member extending only along the top of the eyewire and partially down the sides thereof, said frame member having a groove in which the eyewire is seated, means on the nasal side of the eyewire for securing it in said groove, the frame member having an integral temporal extension extending below said connectors, a hinge plate secured to the rear side of the extension, the upper connector on the eyewire being secured to said hinge plate whereby the temporal portions of the eyewire and frame member are connected, said extension having a cut-away portion intersecting the groove and extending downwardly from the lower connector whereby the lower connector may be moved downwardly when inserting a lens in the eyewire.

RAYMOND F. E. STEGEMAN.

REFERENCES CITED

The following references are of record in the file of this patent:

UNITED STATES PATENTS

| Number | Name | Date |
| --- | --- | --- |
| 502,782 | Spencer | Aug. 8, 1893 |
| 780,470 | Baker | Jan. 17, 1905 |
| 1,428,749 | Brown | Sept. 12, 1922 |
| 1,515,624 | Schumacher et al. | Nov. 18, 1924 |
| 1,844,143 | Bouchard | Feb. 9, 1932 |
| 1,935,433 | Bosworth | Nov. 14, 1933 |
| 2,243,769 | Nerney | May 27, 1941 |
| 2,284,630 | Banks | June 2, 1942 |
| 2,329,100 | Chappell | Sept. 7, 1943 |
| 2,345,065 | Nerney | Mar. 28, 1944 |
| 2,350,338 | Casavant | June 6, 1944 |
| 2,355,053 | Carlson | Aug. 8, 1944 |
| 2,357,267 | Rohrbach | Aug. 29, 1944 |

FOREIGN PATENTS

| Number | Country | Date |
| --- | --- | --- |
| 341,327 | Great Britain | June 15, 1931 |
| 794,129 | France | Dec. 2, 1935 |